United States Patent [19]
Weisse et al.

[11] Patent Number: 5,993,162
[45] Date of Patent: *Nov. 30, 1999

[54] RAMPED DOVETAIL RAILS FOR ROTOR BLADE ASSEMBLY

[75] Inventors: Michael Weisse, Tolland; David M. Daley, Manchester; Harold R. Smart, Jr., Hebron, all of Conn.

[73] Assignee: United Technologies Corporation, Hartford, Conn.

[*] Notice: This patent is subject to a terminal disclaimer.

[21] Appl. No.: 08/497,000

[22] Filed: Jun. 30, 1995

Related U.S. Application Data

[63] Continuation of application No. 08/236,717, Apr. 29, 1994, Pat. No. 5,431,542.

[51] Int. Cl.⁶ .................................................. F01D 5/30
[52] U.S. Cl. .................................................. 416/219 R
[58] Field of Search ........................ 416/196 R, 200, 416/219 R

[56] References Cited

U.S. PATENT DOCUMENTS

| Re. 33,954 | 6/1992 | Honda et al. | 416/219 R |
|---|---|---|---|
| 2,833,515 | 5/1958 | Newcomb | 416/219 R |
| 4,265,595 | 5/1981 | Bucy, Jr. et al. | 416/220 R |
| 4,451,205 | 5/1984 | Honda et al. | 416/219 R |
| 4,645,425 | 2/1987 | Morrison, Jr. | 416/219 R |
| 5,139,389 | 8/1992 | Eng et al. | 416/219 R |

FOREIGN PATENT DOCUMENTS

| 986022 | 7/1951 | France | 416/219 R |
|---|---|---|---|
| 1095392 | 6/1955 | France . | |

*Primary Examiner*—John Kwon

[57] ABSTRACT

A fan blade (34) of a gas turbine engine (10) includes a pair of root rails (54) disposed on a bottom (56) of a dovetail root portion (44) thereof. The pair of root rails (54) has a wedge-shaped contour and is tapered in a decreasing cross-section from the leading edge (50) to the trailing edge (52). The root rails (54) provide a wide, stable base for the blade to minimize tangential motion during windmilling. A pair of slot rails (76) is provided on the base (70) of a dovetail-shaped slot (40) retaining the dovetail root portion (44) of the blade (34). The slot rails (76) of the dovetail slot (40) mate with the root rails (54) of the dovetail root portion (44).

6 Claims, 3 Drawing Sheets

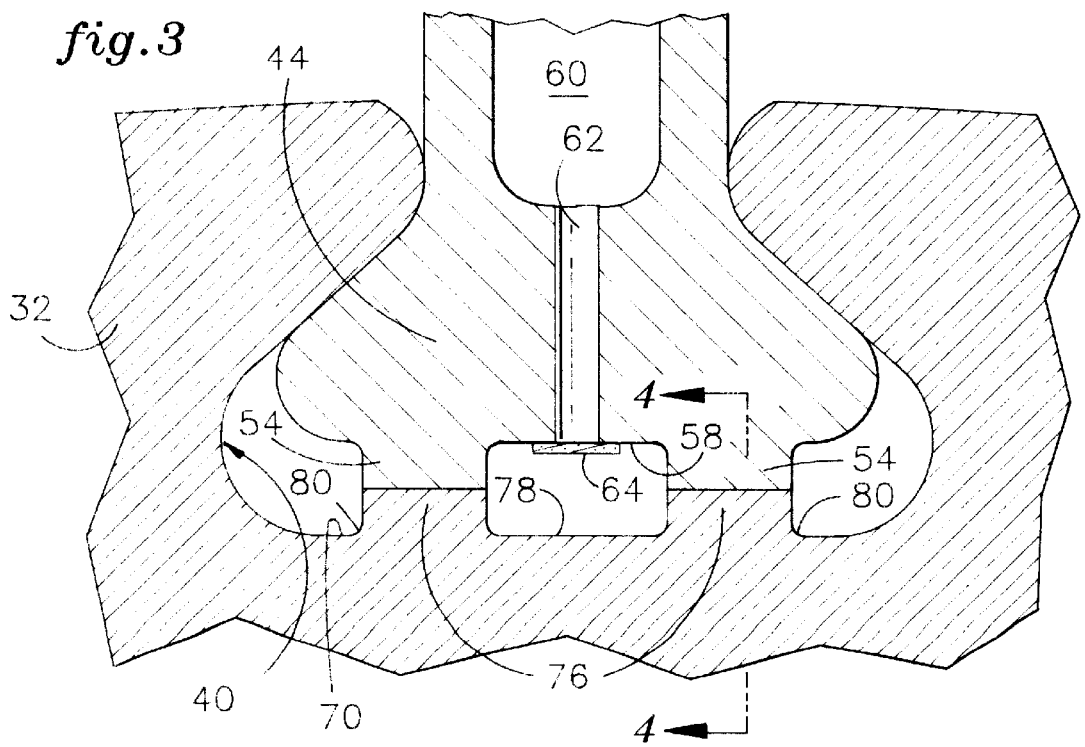
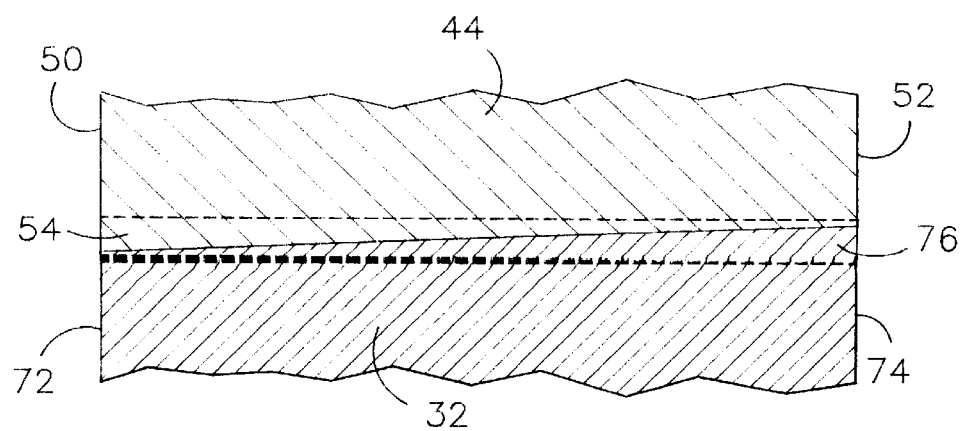

RAMPED DOVETAIL RAILS FOR ROTOR BLADE ASSEMBLY

This is a request for filing a Continuation application under 37 CFR 1.62 of application Ser. No. 08/236,717 filed on Apr. 29, 1994, now U.S. Pat. No. 5,431,542.

TECHNICAL FIELD

This invention relates to gas turbine engines and, more particularly, to rotor blades therefor.

BACKGROUND OF THE INVENTION

A widely used type of a gas turbine engine is a turbofan. The distinguishing feature of the turbofan is an axial flow fan disposed in the forward portion of the engine within an open duct. The fan is equipped with rotating blades and stationary vanes. Each fan blade comprises an airfoil portion and a dovetail-shaped root portion secured in a fan disk. The fan disk includes a plurality of dovetail-shaped slots disposed circumferentially therein to engage the dovetail root portion of the blades. The disk and the blades are typically manufactured from a metal alloy.

Windmilling is one of many conditions to which the gas turbine engine is subjected, having adverse consequences. During windmilling, which occurs when the aircraft is parked on the ground with its engine shut down, wind enters the forward or aft portion of the engine and imparts tangential (with respect to the disk) motion to the fan assembly, thereby subjecting the fan blades to rocking motion within the disk slots. As the fan blades and disk rotate, a gravitational force tends to pull each blade reciprocally in opposite tangential direction depending upon which side of the engine the blade is disposed. As the blades reciprocate tangentially due to windmilling, they rock from one side of the slot to the opposite side of the slot banging against the opposite side of the slot. Such repetitive impact causes abrasion on the disk and the blades. Although both the disk and the blades are coated with an antigallant coating, both the disk and the blades are nonetheless damaged gradually over extended periods of time.

Although the top portion of the dovetail root portion experiences the most damage due to additional wear caused by the centrifugal loading during operation of the engine, the bottom of the dovetail portion also becomes worn. The problem of abrasion on the bottom of the dovetail is exacerbated by the location of vent openings thereon, which are characteristic of and necessary for the manufacture of hollow fan blades. Furthermore, the vent openings must be sealed to prevent potential contaminants, such as sand, dust, or oil, from entering into internal cavities of the blade. The sealants used to close the vent openings must also be protected from abrasion due to motion of the blades within the slot.

The worn blades and disks either must be repaired periodically or replaced if damage is beyond repair. Both alternatives are costly. The problem of tangential motion in fan blades during windmilling is particularly acute in modern blades that do not include mid-span shrouds. The mid-span shrouds tend to provide structural support and to hold blades separated and in an upright position.

U.S. Pat. No. Re 33, 954 entitled "Rotor Blade Assembly" issued to Honda et al and assigned to United Technologies Corporation discloses a fan assembly having a single wedge-shaped protrusion extending outwardly from the base of each disk slot and a tapered surface at the bottom of the root section of the corresponding blade. Although the arrangement facilitates improved disassembly of blades from the disk, it does not minimize the above noted reciprocating tangential motion of the blades during windmilling.

During operation of the engine, the disk experiences extreme stresses, including a circumferential (hoop) stress. The circumferential stress field in the disk is a substantially circular, continuous field occurring in a "live rim", which is defined as a continuous outer contour within the disk, without any interruptions. The circumferential stress is particularly undesirable if it occurs in locations such as the above-noted wedge-shaped protrusions at the bottoms of the disk slots.

Thus, there is a need to minimize damage to fan blades and to the disk that may be caused by the reciprocating tangential motion of the fan blades within the disk slots without a weight penalty. Additionally, it is necessary to reduce hoop stress proximal to the bottoms of the disk slots.

DISCLOSURE OF THE INVENTION

According to the present invention, a pair of root rails is provided on the bottom of a dovetail-shaped root portion of a gas turbine engine blade to minimize reciprocating tangential motion of the blades within dovetail-shaped slots in which the root portions of the blades are retained. Each root rail is wedge-shaped, tapering in a decreasing cross-section from the leading edge to the trailing edge of the blade. The root rails provide a wide, stable base for the blade and thus minimizes reciprocating tangential motion of the blade within the slot during windmilling. A root groove formed between the root rails, minimizes the weight of the blade and protects a plurality of vent openings formed therein as well as a sealant for the vent openings, from being abraded during tangential motion of the blade within the slot.

According to an aspect of the present invention, a pair of slot rails on the base of the disk slot mates with the blade root rails. Each slot rail is wedge-shaped and tapers oppositely to the corresponding blade root rail. A slot groove, defined between the pair of the slot rails, moves the circumferential stress radially inwardly from the outer edges of the slot rails, thus improving fatigue life of the disk.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 3 is an enlarged front, cross-sectional view of the portion of the fan blade and the fan disk of FIG. 2; and FIG. 4 is a fragmentary cross-sectional view taken in the direction of line 4—4 of FIG. 3.

BEST MODE FOR CARRYING OUT THE INVENTION

Figure 1:
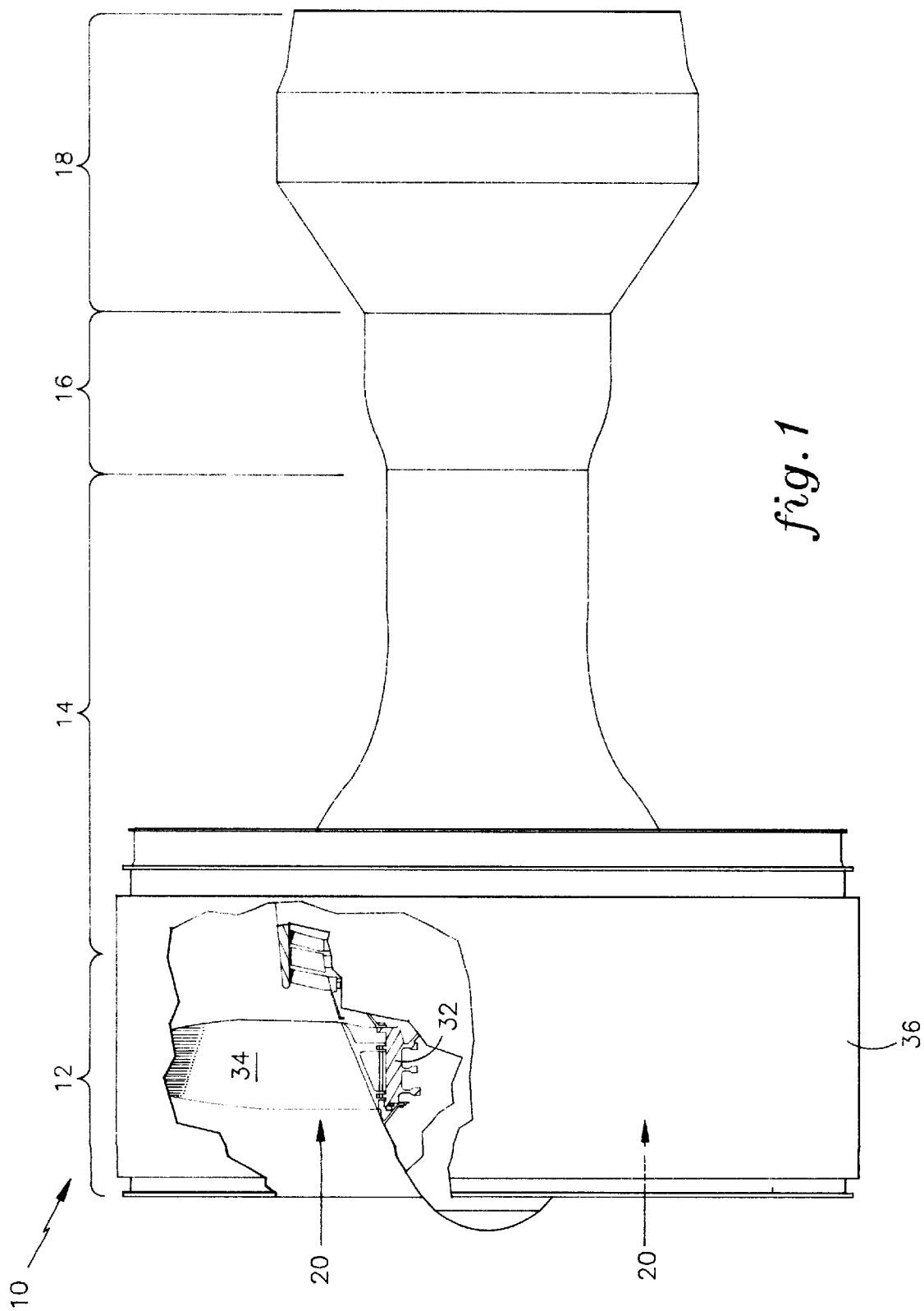
FIG. 1 is a simplified, partially sectioned view of a gas turbine engine of the type employing a rotor blade assembly of the present invention.

Referring to FIG. 1, a gas turbine engine 10 includes a fan section 12, a compressor 14, a combustor 16, and a turbine 18. Air 20 flows axially through the sections 12–18 of the engine 10. The fan 12 accelerates the air to contribute to the overall thrust produced by the engine. As is well known in the art, the air 20, compressed in the compressor 14, is mixed with fuel which is burnt in the combustor 16 and expanded in the turbine 18, thereby rotating the turbine 18 and driving the fan 12 and the compressor 14.

Figure 2:
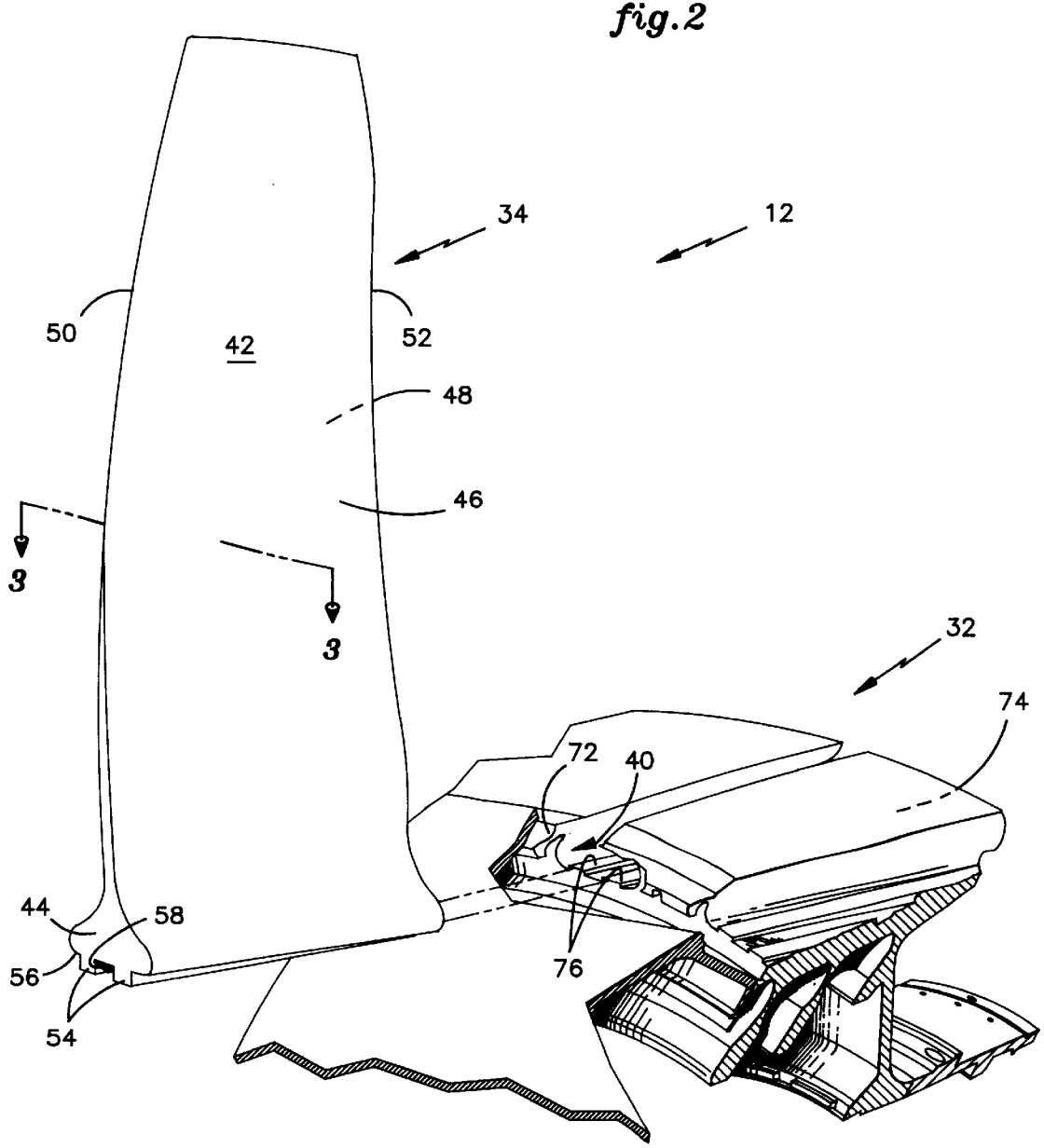
FIG. 2 is an enlarged, exploded top perspective view of a fan blade having a pair of root rails thereon and a fan disk having a pair of slot rails thereon, according to the present invention.

The fan section 12 includes a fan disk 32 and a plurality of fan blades 34 within an open duct 36. The disk 32 includes a plurality of dovetail slots 40 formed within the outer circumference of the disk to retain the fan blades 34, as shown in FIG. 2.

Each fan blade 34 comprises an airfoil-shaped portion 42 and a dovetail-shaped root portion 44. The airfoil-shaped portion 42 includes a concave wall 46 and a convex wall 48 extending in a chordwise direction from a leading edge 50 to a trailing edge 52. The dovetail-shaped root portion 44 includes a pair of wedge-shaped root rails 54 extending from a bottom 56 of the dovetail-shaped root portion 44. The root rails 54 are tapered in decreasing cross-section from the leading edge 50 to the trailing edge 52 of the blade 34. The pair of the root rails 54 define a root groove 58 therebetween. The blade 34 includes a hollow cavity 60 therein, as shown in FIG. 3. A plurality of vent openings 62 (necessary for manufacturing reasons) are formed within the dovetail-shaped root portion 44, providing communication between the cavity 60 and the root groove 58 on the bottom 56 of the dovetail root portion 44. A sealant 64, disposed within the root groove 58 over the opening 62, is used to close the opening 62 and to prevent contaminants from entering the hollow cavity 60.

Each dovetail slot 40 includes a base 70 and extends from a front side 72 to a rear side 74 of the disk 32, so that when the slot 40 fully engages the dovetail root 44 of the blade 34, the leading edge 50 of the blade 34 is aligned with the front side 72 of the disk 32 and the trailing edge 52 of the blade 34 is aligned with the rear side 74 of the disk 32, as best shown in FIG. 4. A pair of wedge-shaped slot rails 76 extends from the base 70 of the slot 40. The slot rails 76 are tapered to mate with the root rails 54. Thus, the cross-section of the slot rails 76 increases from the front side 72 to the rear side 74, oppositely from the taper of the root rails 54. The slot rails define a slot groove 78 therebetween.

During operation of the engine 10, the disk 32 experiences extreme stresses, including high circumferential (hoop) stress in the area at outer edges 80 of the slot rails 76. The slot groove 78 between the pair of slot rails 76 causes an interruption within the disk 32 and therefore relocates the hoop stress radially inwardly of the slot base. Thus, the groove 78, by relocating the circumferential stress radially inwardly of the high stress concentration area at the outer edges 80 of the slot rails 76, improves the fatigue life of the disk 32 and enables the disk 32 to tolerate more cycles than a disk without the slot groove 78 would.

During windmilling, a condition occurring when the aircraft is parked on the ground with its engine shut down, the wind enters the forward or aft portion of the engine and imparts tangential (with respect to the disk 32) motion to the fan 12. As the fan 12 rotates, gravitational forces tend to pull each blade 34 reciprocally in opposite tangential direction depending on which side of the engine the blade is disposed. The pair of root rails 54 minimizes reciprocating tangential rocking motion of the blades 34 due to the readjustment within the slots 40 by providing a wider and more stable base. The root groove 58 minimizes the overall weight of the blade 34 by eliminating material therefrom and shields the openings 62 and the sealant 64 from abrasion against the slot 40 during operation in windmilling of the engine.

Although the invention has been shown and described with respect to exemplary embodiments thereof, it should be understood by those skilled in the art that various changes, omissions, and additions may be made thereto, without departing from the spirit and scope of the invention. For example, these concepts may be used on blades other than fan and are not limited to fan blade applications.

What is claimed:

1. A blade for use in a gas turbine engine, said blade having an airfoil portion and a dovetail root portion integrally attached to said airfoil portion said airfoil portion having a leading edge and a trailing edge, said blade characterized by:

a pair of root rails disposed on and integral with a bottom of said dovetail root portion of said blade to minimize motion of said blade during windmilling; and a root groove defined between said root rails.

2. The blade according to claim 1 characterized by said pair of root rails having a wedge-shaped contour, said pair of root rails being tapered in a direction of decreasing cross-section from said leading edge to said trailing edge of said blade.

3. The blade according to claim 1 or 2 characterized by a plurality of vent openings disposed within said root groove.

4. A fan for use in a gas turbine engine having a plurality of fan blades and a fan disk with a plurality of dovetail slots to receive said plurality of fan blades, each said fan blade having an airfoil portion and a dovetail root portion integrally attached to said airfoil portion, said airfoil portion having a leading edge and a trailing edge, said fan disk having a front side corresponding to said leading edge of said blade and a rear side corresponding to said trailing edge of said blade, said dovetail root portion retained within said dovetail slot, said fan characterized by:

a pair of root rails, disposed on and integral with a bottom of said dovetail root portion of said blade to minimize said blade motion during windmilling; and a pair of slot rails disposed on and integral with a base of said dovetail slot, said pair of slot rails mating with said pair of root rails; and a root groove defined between said pair of root rails.

5. A fan according to claim 4 characterized by:

said pair of root rails having a wedge-shaped contour, said pair of root rails extending from said leading edge of said airfoil to said trailing edge thereof, said pair of root rails being tapered in a direction of decreasing cross-section from said leading edge to said trailing edge of said blade, and said pair of slot rails having a wedge-shaped contour, said pair of slot rails extending from said front side of said disk to said rear side thereof, said pair of slot rails being tapered in a direction of increasing cross-section from said front side to said rear side of said fan disk.

6. The fan according to claim 4 or 5 characterized by a slot groove defined between said pair of slot rails for locating high hoop stresses radially inwardly therefrom.

* * * * *